W. Watson,
Scraper.
No. 94,154. Patented Aug 24, 1869.
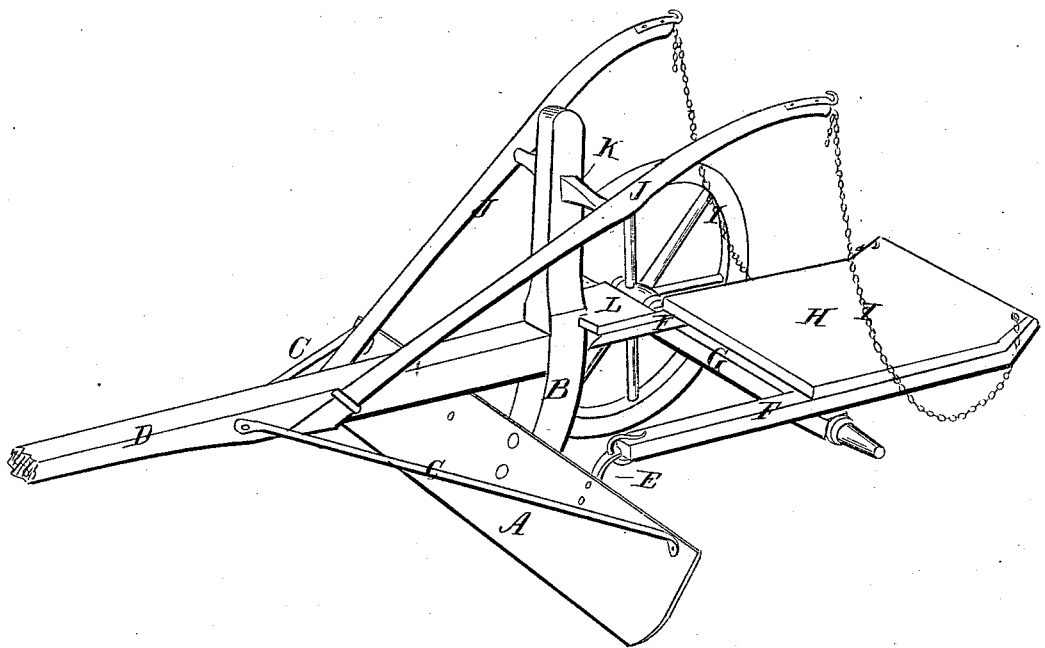
Witnesses
Harry King
[signature]
Inventor
Wm Watson
per
Alexander Mason
Attys

United States Patent Office.

WILLIAM WATSON, OF DANVILLE, ILLINOIS.

Letters Patent No. 94,154, dated August 24, 1869.

IMPROVED SCRAPER.

The Schedule referred to in these Letters Patent and making part of the same.

*To all whom it may concern:*

Be it known that I, WILLIAM WATSON, of Danville, in the county of Vermilion, and in the State of Illinois, have invented certain new and useful Improvements in Ditcher and Grader; and do hereby declare that the following is a full, clear, and exact description thereof, reference being had to the accompanying drawings, and to the letters of reference marked thereon.

The nature of my invention consists in the construction and arrangement of a ditcher and grader, whereby the scraper can be worked with more ease, rapidity, and at a less expense, than by any other way.

In order to enable others skilled in the art to which my invention appertains, to make and use the same, I will now proceed to describe its construction and operation, referring to the annexed drawings, which form a part of this specification, and which represent a perspective view of my machine.

A represents the scraper, which, at its centre, is firmly secured to an upright beam, B. From the ends of the scraper A, braces C C connect the same with the tongue D, which projects from a suitable point on the beam B.

On each side of the beam B, and at suitable distance from the same, on the scraper A, is placed a small bar, E, projecting upward, and slightly bent toward the rear. The bars E E are hooked, or otherwise attached to the front ends of two shafts, F F, which extend toward the rear, and to the under side of which, at a suitable point, an axle, G, is placed, said axle having a wheel at each end. The axle should be so placed that the shafts F F may extend sufficiently far in rear to support a platform, H, which is placed on the upper side of said shafts, so that the front end of the platform will be about even with the axle.

The rear end of the platform H is connected by chains I I, to the ends of the handles J J, which are secured to the tongue D, and to a cross-bar, K, on the beam B. On the rear side of the beam B is a small platform, L.

The operation of this machine is very simple, and needs no explanation. The operator stands on the large platform H, and by merely stepping from the same on to the small platform L, and back again, the scraper is easily filled and emptied.

Having thus fully described my invention,

What I claim as new, and desire to secure by Letters Patent, is—

The combination of the scraper A, beam B, and handles J J, platform H, on the axle G, chains I I, and small platform L, all substantially as shown and described.

In testimony that I claim the foregoing, I have hereunto set my hand, this 22d day of February, 1869.

WILLIAM WATSON.

Witnesses:
PETER WALSH,
H. C. LESLEY.